United States Patent
Koeppl

[11] Patent Number: 5,351,747
[45] Date of Patent: Oct. 4, 1994

[54] HEAT EXCHANGER ESPECIALLY FOR SPACECRAFT

[75] Inventor: Alois Koeppl, Stuhr-Moordeich, Fed. Rep. of Germany

[73] Assignee: Erno Raumfahrttechnik GmbH, Bremen, Fed. Rep. of Germany

[21] Appl. No.: 969,409

[22] Filed: Oct. 30, 1992

[30] Foreign Application Priority Data

Nov. 2, 1991 [DE] Fed. Rep. of Germany ....... 4136219

[51] Int. Cl.⁵ .................... F28D 15/00; B64G 1/50
[52] U.S. Cl. ........................... 165/41; 165/86; 165/104.31; 165/904; 244/163
[58] Field of Search ............... 165/41, 86, 104.31, 165/904; 244/163

[56] References Cited

U.S. PATENT DOCUMENTS

| | | | |
|---|---|---|---|
| 3,363,676 | 1/1968 | Hunter, Jr. ............... | 165/86 |
| 4,789,517 | 12/1988 | Webb et al. ............... | 165/86 |
| 5,062,472 | 11/1991 | Blackmon et al. .......... | 165/41 |

OTHER PUBLICATIONS

"Liquid Droplet Radiator Research", by J. Persson; EWP-1579, ESTEC 1990, pertinent pages only.

*Primary Examiner*—Albert W. Davis, Jr.
*Attorney, Agent, or Firm*—W. G. Fasse; W. F. Fasse

[57] ABSTRACT

A heat exchanger for a spacecraft utilizes a droplet radiator, whereby the droplet collector has the shape of a rotation symmetrical ring body that is rotatable about a central rotational axis. Preferably, the rotation symmetric ring body has the shape of a wheel, whereby the droplet generator is arranged near the rotational axis of symmetry and the collector forms a wheel rim. The return flow of the coolant takes place either through the spokes of the wheel which connect the droplet collector wheel rim to the hub or through a separate suction conduit. A secondary coolant flow circuit may be integrated into the droplet collector.

17 Claims, 3 Drawing Sheets

HEAT EXCHANGER ESPECIALLY FOR SPACECRAFT

FIELD OF THE INVENTION

The invention relates to a heat exchanger especially useful for spacecraft. Such a heat exchanger is constructed as a droplet radiator including a droplet generator, a droplet collector, and means for returning collected droplets of a cooling liquid.

BACKGROUND INFORMATION

Heat exchangers of the type described above are disclosed in an article entitled "Liquid Droplet Radiator Research" by J. Persson, EWP-1579, ESTEC 1990. Such heat exchangers are highly efficient and therefore gain ever increasing significance and acceptance in space flight compared to other conventional radiators of the same mass. Another advantage of the liquid droplet radiator is seen in its substantially smaller sensitivity against damage by meteorite impacts when operating in outer space.

The larger capacity and efficiency of such droplet heat exchangers is due to the fact that in a droplet radiator the heat to be discharged is not discharged into the outer space by way of a detour through the radiator wall. Rather, the heat is radiated directly from the cooling liquid into the outer space. The function of the heat dissipating walls of a conventional radiator is taken over in a droplet radiator by a droplet cloud freshly travelling through the outer space for the cooling purpose. These droplets are generated by the droplet generator, caused to fly through outer space, whereby their heat is discharged, and are then collected as cooled droplets in the droplet collector. A pump circulates the droplets from the droplet collector to a heat absorption location which may be a conventional heat exchanger, the outer surfaces of which come into contact with the droplets.

OBJECTS OF THE INVENTION

In view of the foregoing, it is the aim of the invention to achieve the following objects singly or in combination:

to construct a droplet radiator or heat exchanger in such a way that its mass is reduced, while its efficacy is optimized;

to provide a droplet radiator that is easily controlled in closed loop fashion;

to provide a construction of such a droplet radiator that is rather easily adaptable or flexible with regard to increasing the size of the cooling system or adapting the size of the cooling system to particular requirements;

to integrate a secondary coolant flow circuit into the droplet collector of the droplet radiator system; and to construct the droplet radiator system in such a way that it can work efficiently with an optimally low pump power.

SUMMARY OF THE INVENTION

The above objects have been achieved according to the invention by the following features. The droplet collector is constructed as a body of rotational symmetry with open ends for exposing droplets to a heat exchange. The droplet generator is arranged in the area of the rotational symmetry axis of the droplet collector and at least the droplet collector is mounted rotatably for rotation about its axis of symmetry.

The just described construction of the heat exchanger according to the invention is comparable to the construction of a rotatable wheel, whereby the droplets are generated at the rotational axis or hub of the wheel, so that the generated droplets are caused to fly under the influence of centrifugal forces radially outwardly as a spray. The droplets are then intercepted by the wheel's rim for transport back to taking up heat again. Important advantages of the invention are seen in the high efficacy, the ease of a closed loop control, and in the flexibility available for building such a system to meet any size requirements and to expand an existing system.

The high efficacy of the heat exchanger according to the invention is based primarily on the utilization of the centrifugal force for two purposes. First, the coolant is returned under the influence of centrifugal forces. Second, the collector structure is stabilized by using centrifugal forces.

A good closed loop control of the collector is achieved by switching off individual sectors of the droplet generator without adversely influencing the flow of coolant. Further, it is possible without much structural effort and expense, to integrate a secondary coolant flow circuit into the collector. Such a secondary coolant flow circuit reduces the effort and expense for the return of the coolant that has been dispersed in the form of droplets. Additionally, such a secondary circuit increases the stability of the collector.

Another advantage of such a secondary coolant flow circuit is seen in that it simplifies the selection of the cooling liquid for the primary cooling circuit, because depending on the type of coolant in the primary cooling circuit, it is possible to reduce the required pumping power. The cooling liquid in the primary circuit shall have a low viscosity at the occurring temperatures, additionally it shall have a low vapor pressure. These features are intended to avoid an excessive vaporization of the cooling liquid on its way from the droplet generator to the collector, and to keep the required pumping power low. However, the viscosity and the vapor pressure of cooling liquids suitable for the present purposes generally have opposing characteristics. Stated differently, a cooling liquid with a low viscosity generally has a high vapor pressure and vice versa, whereby a difficulty may be encountered. However, this difficulty can be overcome by using the above mentioned secondary coolant circulating circuit, because the secondary circuit permits advantageously changing the cooling process.

An especially simple, lightweight, and compact embodiment of the present heat exchanger is provided by constructing the collector of a synthetic material hose which is inflated by the cooling medium of the secondary coolant circulating circuit.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figures 1, 2:
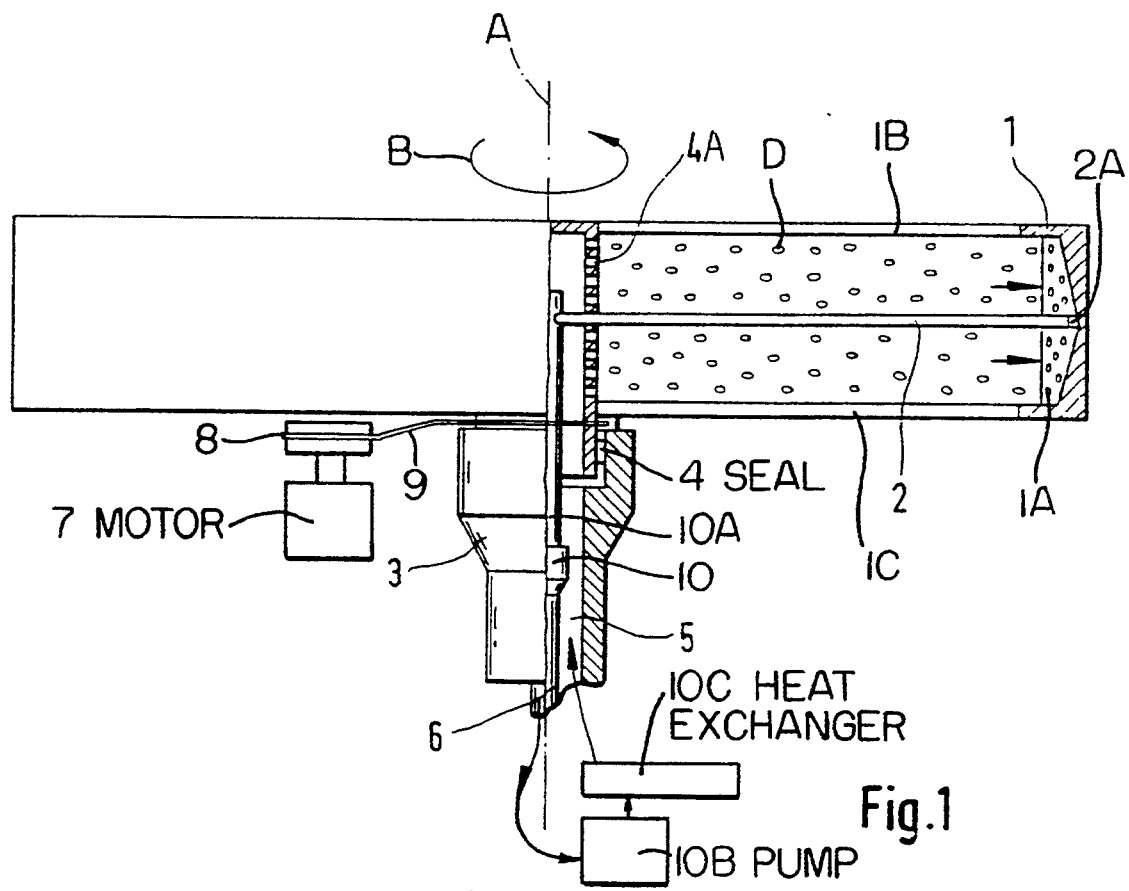
FIG. 1 is a side view, partly in section, of one embodiment of a droplet heat exchanger formed with a rotatable hub as a droplet generator and with a rotatable wheel rim as a droplet collector according to the invention.
FIG. 2 is a view similar to that of FIG. 1, but showing a modified embodiment with a stationary droplet generator, with a rotatable shaft, and with a rotatable wheel rim.

FIG. 1 shows a first embodiment of a droplet radiator or heat exchanger according to the invention constructed in the shade of a wheel having a rotatable hub 4 and a rotatable rim 1 interconnected by spokes 2. The rim 1 forms a trough 1A that is open radially inwardly for the collection of droplets D sprayed out of holes 4A in the hub 4. Thus, the hub 4 functions as a droplet generator which receives the coolant through an inlet duct 5 provided in the rotating, hollow drive hub 3 which is driven by a motor 7 through, for example, a pulley 8 and a belt 9. The drive hub 3 drives the hub 4 and thus the rim 1 through the spokes 2.

FIG. 1 further shows that the rim 1 forming the droplet collector has an approximately U-shaped cross-section to form the trough 1A. The bottom of the trough slopes toward the connection point of the spokes 2 with the rim 1, whereby the collected liquid is forced toward an opening 2A in each spoke for a return flow through the hollow spokes 2 as indicated by the arrow 2B into a return duct 10A that rotates with the hub 4, and which is connected to the stationary return flow duct 6 by a coupling 10 that permits the connection of the rotating duct 10A with the stationary duct 6. A pump 10B is connected to the return flow duct 6 and to a heat exchanger 10C which in turn is connected to the inlet duct 5. The drive components, the pump, and the heat exchanger are all of conventional construction. The coolant liquid in the just described primary coolant circulating circuit is heated in the heat exchanger 10C and then returned into the inlet 5, whereby the droplet radiator, the pump, and the head exchanger form a closed coolant flow circuit.

The drive 7, 8, 9 rotates the drive hub or shaft 3 about the central axis A as indicated by the arrow B. As a result, the coolant in the hollow hub 4 is forced out of the holes 4A thereby forming of droplets D which to travel radially outwardly under the centrifugal force generated by the rotation of the hub 4 operating as a droplet generator The sides 1B and 1C between the hub 4 and the rim 1 are open so that the droplets D on their radially outward way are in contact with the environment in outer space thereby giving off their heat. Due to the above mentioned slanting floor in the radially inwardly facing droplet collector trough 1A of the rim 1, a centrifugal force component drives the droplets toward the collection opening 2A in the spokes 2, thereby enhancing the return flow which in turn makes it possible to optimally reduce the power needed for driving the pump 10B. The spokes 2 function as suction ducts, the function of which is enhanced by the centrifugal force that drives the droplets toward the inlet opening 2A due to the slanted floor as mentioned.

From the above description of FIG. 1, it is clear that in this embodiment, the entire droplet heat exchanger including its hub 4, its spokes 2, and its rim 1 are rotating.

FIG. 2 illustrates an embodiment in which only the collector rim 11 is caused to rotate with a central drive shaft 13 connected to the rim 11 by laterally placed spokes 12 so that the opposite side 12A of the rim 11 is open for the above mentioned contact of the droplets D with the environment. Thus, the rotation of the shaft 13 driven by the drive DR does not interfere with the stationary position of the droplet generator 14 connected to an inlet pipe 15 for the supply of the cooling liquid. A return flow duct 16 reaches with its collecting suction end 17 into the deepest portion of a trough 11A formed by the rim 11. Here again, the bottom of the trough 11A slants toward the deepest portion of the trough so that a centrifugal force component pushes collected droplets toward the open end 16A of the return flow conduit 16.

The suction end 17 with its intake opening 16A leads into the return conduit 16 and to a pump not shown. The droplet generator 14 is connected through the conduit 15 to a heat exchanger which in turn is connected to a pump as shown in FIG. 1. The drive shaft 13 is mounted in a bearing C which is conventional. The droplet generator 14 is constructed as a ring sleeve encircling the drive shaft 13.

Figure 3:
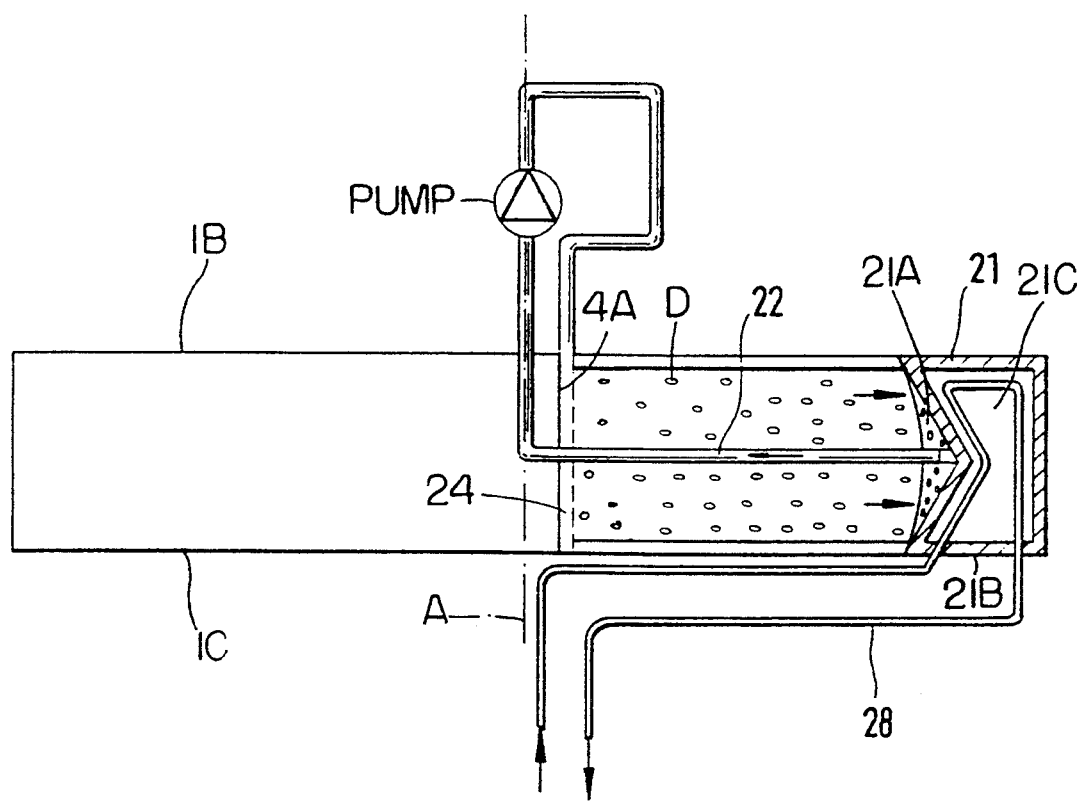
FIG. 3 is a view of a third embodiment with a laterally open, rotatable wheel rim, wherein a secondary coolant circulating flow circuit is received.

FIG. 3 shows an embodiment with a droplet collector rim 21 that forms a trough 21A with a slanted bottom for collecting the droplets D and for returning collected cooling liquid in the spokes 22 as described above with reference to FIG. 1. The slanting bottom of the trough 21A again utilizes a component of the centrifugal force for crowding the collected droplets toward an intake opening of the spokes 22 which lead into the cooling circuit driven by a pump as described above. The rotation of the wheel also takes place as described above. However, in FIG. 3, the rim 21 is laterally open as shown at 21B to form an open space 21C in which a portion of a coolant circulating secondary cooling circuit 28 is located. The portion of this circuit inside the space 21C can be stationary even though the rim 21 rotates as in FIG. 2, since the rim 21 is open at 21B. The droplet generator 24 generates the droplets and the spokes 22 return the cooling liquid as described above with reference to FIG. 1.

It is possible to use a secondary coolant flow circuit as shown at 28 in FIG. 3, also in the embodiment of FIG. 2 by appropriately shaping the rim 11.

Figure 4:
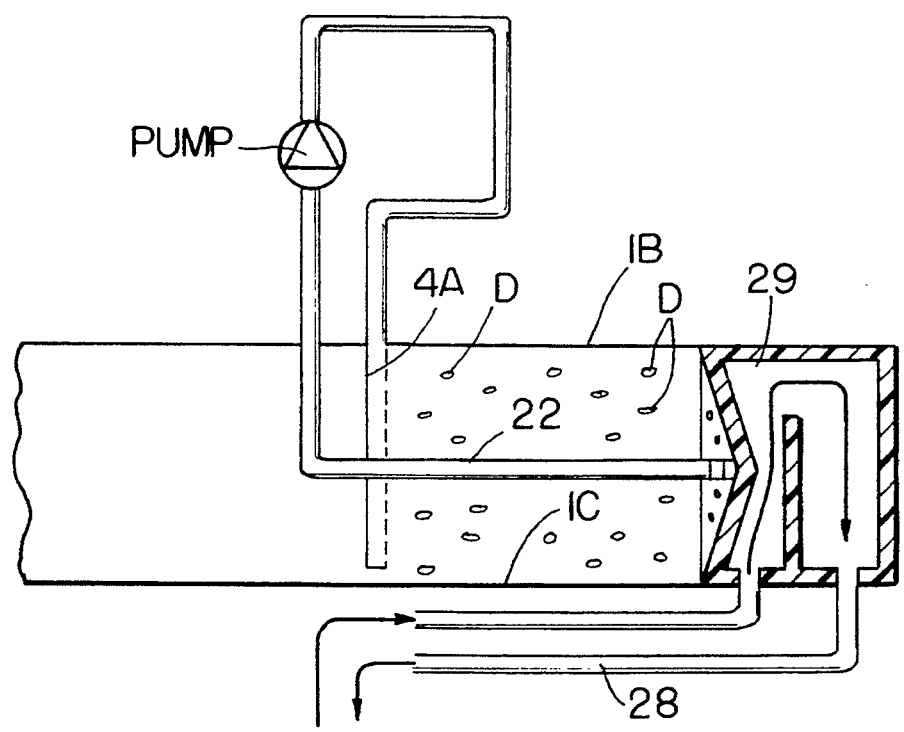
FIG. 4 is a sectional view through a fourth embodiment, wherein the rotatable wheel rim is constructed as a synthetic material hose.

FIG. 4 shows a further embodiment, wherein the wheel rim 29 functioning as a droplet collector and rotatable as in FIG. 2, is constructed as a synthetic material hose, preferably an inflatable hose. The fluid interface in FIG. 4 is the same as in FIG. 1, whereby the droplets D on their way to the collector rim 29 are in contact with the environment thereby giving off heat.

Although the invention has been described with reference to specific example embodiments it will be appreciated that it is intended to cover all modifications and equivalents within the scope of the appended claims.

What I claim is:

1. A heat exchanger for a spacecraft, comprising a central rotational axis, a droplet radiator including a droplet generator positioned centrally about said central rotational axis, a droplet collector positioned radially outwardly around said droplet radiator, and a liquid return arrangement for returning cooling liquid from said droplet collector to said droplet generator, said droplet collector comprising a ring body having substantial rotational symmetry relative to said central rotational axis, said ring body forming an annular free space between said droplet generator and said ring body, said annular free space being open at two parallel radial planes, whereby coolant droplets exiting from said droplet generator and travelling through said annular free space radially outwardly from said droplet generator to said ring body are in direct contact with the environment surrounding said heat exchanger thereby directly giving off heat to said environment before being collected by said ring body of said droplet collector, and a drive operatively connected to rotate at least said droplet collector about said central rotational axis, wherein said droplet generator, said droplet collector and said liquid return arrangement together form a primary coolant flow circuit, and further comprising a secondary coolant flow circuit arranged at least partly within a hollow portion of said droplet collector.

2. The heat exchanger of claim 1, comprising a wheel structure comprising a rim forming said ring body of said droplet collector, spokes and a hub, said spokes connecting said rim to said hub, wherein said drive is operatively connected to rotate said hub.

3. The heat exchanger of claim 2, wherein said spokes comprise hollow pipes, each hollow pipe having an opening at its radially outer end for returning said cooling liquid collected in said droplet collector, wherein said hollow pipes form at least part of said liquid return arrangement.

4. The heat exchanger of claim 2, wherein said droplet generator forms part of said driven hub, whereby said droplet generator is rotatable with said driven hub.

5. The heat exchanger of claim 1, wherein said drive comprises a drive shaft and said droplet generator comprises a cylindrical sleeve surrounding said drive shaft and wherein said droplet generator is stationary.

6. The heat exchanger of claim 1, wherein said droplet collector is constructed of a synthetic material hose.

7. The heat exchanger of claim 6, wherein said synthetic material hose is inflatable and wherein coolant flowing in said secondary coolant flow circuit is used to inflate said synthetic material hose.

8. The heat exchanger of claim 1, wherein said ring body of said droplet collector forms a radially inwardly open trough for collecting said coolant droplets, said trough having a radially outward slanted bottom for providing a centrifugal force component that urges said collected coolant droplets into a return flow of said liquid return arrangement.

9. A heat exchanger for a spacecraft, comprising a central rotational axis, a droplet radiator including a droplet generator positioned centrally about said central rotational axis, a synthetic material inflatable hose forming a droplet collector positioned radially outwardly around said droplet radiator, and a liquid return arrangement for returning cooling liquid from said droplet collector to said droplet generator, said synthetic material hose of said droplet collector forming a cooling liquid inflated ring body having substantial rotational symmetry relative to said central rotational axis, a hub and spoke connecting said ring body to said hub to form a wheel structure, said ring body forming an annular free space between said droplet generator and said ring body, said annular free space being open through between said spokes in both axial directions at two parallel radial planes defined by said ring body, whereby coolant droplets exiting from said droplet generator and travelling radially outwardly through said annular free space from said droplet generator to said ring body are fully in direct heat exchange contact in all directions with the environment surrounding said heat exchanger thereby directly giving off heat to said environment before being collected by said ring body of said droplet collector, and a rotational drive operatively connected to at least said droplet collector ring body.

10. The heat exchanger of claim 9, wherein said rotational drive is operatively connected to said hub and through said spokes to said droplet collector ring body.

11. The heat exchanger of claim 10, wherein said spokes comprise hollow pipes, each hollow pipe having an opening at its radially outer end for returning said cooling liquid collected in said droplet collector, wherein said hollow pipes form at least part of said liquid return arrangement.

12. The heat exchanger of claim 10, wherein said droplet generator forms part of and is rotatable with said driven hub.

13. The heat exchanger of claim 9, wherein said rotational drive comprises a drive shaft and said droplet generator comprises a perforated cylindrical sleeve surrounding said drive shaft, and wherein said perforated cylindrical sleeve of said droplet generator is stationary.

14. The heat exchanger of claim 9, wherein said droplet generator, said droplet collector and said liquid return arrangement together form a primary coolant flow circuit, and further comprising a secondary coolant flow circuit.

15. The heat exchanger of claim 14, wherein said secondary coolant flow circuit is arranged at least partly within a hollow portion of said droplet collector formed by said synthetic material hose.

16. The heat exchanger of claim 15, wherein said secondary coolant flowing in said secondary coolant flow circuit inflates said synthetic material hose.

17. The heat exchanger of claim 9, wherein said synthetic material hose forming said ring body of said droplet collector has a cross-section with a radially inwardly open trough for collecting said coolant droplets, said trough having a slanted bottom for providing a centrifugal force component that urges said collected coolant droplets into a return flow of said liquid return arrangement.

* * * * *